United States Patent
Roden et al.

(10) Patent No.: US 10,136,167 B1
(45) Date of Patent: *Nov. 20, 2018

(54) SYSTEM AND METHOD FOR SELECTING A VIDEO FOR INSERTION INTO AN ONLINE WEB PAGE

(71) Applicant: Inform, Inc., Atlanta, GA (US)

(72) Inventors: Mark Roden, Sherman Oaks, CA (US); Chris Smith, Burbank, CA (US)

(73) Assignee: Inform, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,148

(22) Filed: Jan. 13, 2017

Related U.S. Application Data

(60) Provisional application No. 62/278,650, filed on Jan. 14, 2016.

(51) Int. Cl.
| | |
|---|---|
| *H04N 21/262* | (2011.01) |
| *H04N 21/234* | (2011.01) |
| *H04L 29/06* | (2006.01) |
| *H04N 21/482* | (2011.01) |
| *H04N 21/858* | (2011.01) |
| *H04N 21/25* | (2011.01) |
| *H04N 21/466* | (2011.01) |

(52) U.S. Cl.
CPC ..... *H04N 21/23424* (2013.01); *H04L 65/403* (2013.01); *H04L 65/4084* (2013.01); *H04N 21/251* (2013.01); *H04N 21/4668* (2013.01); *H04N 21/4826* (2013.01); *H04N 21/8586* (2013.01)

(58) Field of Classification Search
CPC ............... H04N 21/26208; H04N 21/26225
USPC ........................................................ 725/36
See application file for complete search history.

(56) References Cited

U.S. PATENT DOCUMENTS

| | | | | |
|---|---|---|---|---|
| 2003/0101454 A1* | 5/2003 | Ozer | ............ | G06Q 30/02 725/42 |
| 2005/0091111 A1* | 4/2005 | Green | ............ | G06Q 30/02 705/14.59 |

* cited by examiner

*Primary Examiner* — Dominic D Saltarelli
(74) *Attorney, Agent, or Firm* — Howard Gitten; Lewis Brisbois Bisgaard & Smith LLP

(57) ABSTRACT

A system for selecting a video to be inserted into an article displayed at a web page includes a blackboard. The blackboard stores extracted values for operation thereon by one or more workers. An article extractor creates an article feature as a function of information extracted from the article and inputs the article feature to the blackboard. A threshold extractor determines a threshold factor as a function of the relevance of the video to the article, and inputting the threshold factor to the blackboard. A more like this recommender receives the article feature and outputs to the blackboard, as a function of the article feature, a more like this recommendation as a list of videos to be placed in the article. A more like this decider determines, as a function of the threshold factor and the more like this recommendation, which video to select as a more like this decision.

25 Claims, 2 Drawing Sheets

SYSTEM AND METHOD FOR SELECTING A VIDEO FOR INSERTION INTO AN ONLINE WEB PAGE

CROSS REFERENCE TO RELATED APPLICATIONS

This application claims priority from U.S. Provisional Patent Application 62/278,650 filed Jan. 14, 2016 entitled System And Method For Selecting A Video For Insertion Into An Online Webpage.

BACKGROUND OF THE INVENTION

This invention is directed to a system and method for automatically, in real time, making recommendations for video content to be inserted to an online webpage, and more specifically, utilizing a shared memory system that implements publication/subscription messaging system to enable multiple workers of different types to operate both asymmetrically and simultaneously with each other to make a recommendation or inserting a video content into a text web page as a function of the recommendations.

It is known in the art, to provide text at a website. It is also known, to provide video content within the text. As known in the art the website sends a request to a server for video content to be inserted into the text. As many as 500 requests per second may be made. Each request is a search for a video or set of videos, that is relevant to the text being displayed to the user. The search must occur within the time that a user will stay on the page; sufficiently quickly before the user/viewer moves to another page.

Studies have shown that twenty percent of users will leave a web page if a page takes longer than one second to load. Therefore, it is desired that recommendations for video to be provided within the text occur within one second or less.

It is known in the art to utilize technologies to make recommendations of video content to be placed within the text of an online article. A system such as Celery®, which is a distributed tasque queue, has been configured to be capable of placing video content within a web based text content, but requires extensive preplanning of the various components that are attached to the system to enable the recommendation and placement to be made. Attaching each new component requires restarting of the entire process. In effect Celery® is tool upon which a recommendation system may be built, such a system as now known, suffers from the disadvantage that it requires time and advanced knowledge of the content of both the video and the text.

A second operating system is known in the art and supplied by Spark. Spark is a generic timing system that utilizes centralized clocks to keep all workers operating on the recommendation for selecting the video being synchronized. However, the system suffers from the disadvantage that no worker can start work until timed into operation by the clock. Furthermore, the system guarantees that all search operations will be operated upon by all workers of a certain type. Accordingly, when a subsystem goes down, the guarantee rule (that a video will be delivered in a timely manner) is unfulfilled breaking the time limit requirement required to adequately provide the video content. Other systems are known in the art such as that provided by Akka. However, these systems are language specific. As a result, they are incompatible with off the shelf components written in other languages and cannot be easily remedied when a problem arises in the operation.

Accordingly, an operating system and method for providing video content to be inserted into a text message within the required parameters for successful insertion, is desired.

BRIEF DESCRIPTION OF THE DRAWINGS

The present disclosure will be better understood by reading the written description with reference to the accompanying drawing figures in which like reference numerals denote similar structure and refer to like elements throughout in which.

SUMMARY OF THE INVENTION

A system for selecting a video to be inserted into an article displayed at a web page includes a blackboard. The blackboard stores extracted values for operation thereon by one or more workers. An article extractor creates an article feature as a function of information extracted from the article and inputs the article feature to the blackboard. A threshold extractor determines a threshold factor as a function of the relevance of the video to the article, and inputting the threshold factor to the blackboard. A more like this recommender, communicating with the blackboard, receives the article feature and outputs to the blackboard, as a function of the article feature, a more like this recommendation as a list of videos to be placed in the article. A more like this decider determines, as a function of the threshold factor and the more like this recommendation, which video to select as a more like this decision.

DETAILED DESCRIPTION OF THE PREFERRED EMBODIMENT

Figure 1:
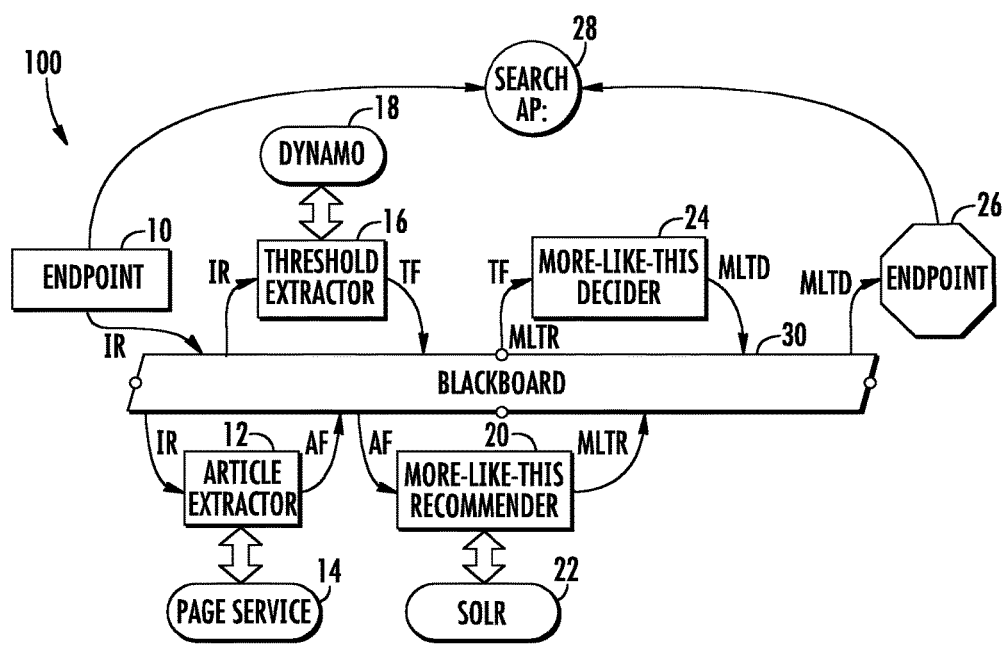
FIG. 1 is an operational diagram of the recommendation and selection system and process for selecting video in accordance with the invention.

As will be seen in FIG. 1, the overall architecture of a system 100 provides that given a URL, a set of nodes process incoming information in a variety of ways, handing completed data to a next node in the chain until a recommendation is provided. As a result, the design becomes extremely scalable and fault tolerant to the loss of internal nodes.

System 100 includes a shared memory system 100. A shared memory system 30 ("blackboard") is a shared memory system for implementing a publication/subscription ("pub/sub") messaging system. Once a message is published to the blackboard 30, any subscriber to that message will be awoken to consume the message and do work upon it, ultimately producing work that will be placed in a different place in the same work item ("tuple") on the blackboard 30.

Computer implemented operations, known as workers, are characterized in two different types. The first type are those that have the same required inputs to begin work, can, and do, work simultaneously, producing the results of their operation without regard to the actions of the other workers. The other type of worker operates on the output of another worker. As a result, workers can use any and all data published by other workers if they are designed to do so, but some workers may require the outputs of other specific workers before they can begin to process information.

This architecture allows for various worker types to be edited or removed from the system to adjust the behavior of the system while at the same time preserving the overall flow of the data. Reference is now made specifically to FIG. 1. Each worker points to a single tuple space so that two end points that point to the same tuple space will produce two identical requests simultaneously on the same tuple space which would result in duplicate work throughout the pipeline.

Figure 2:
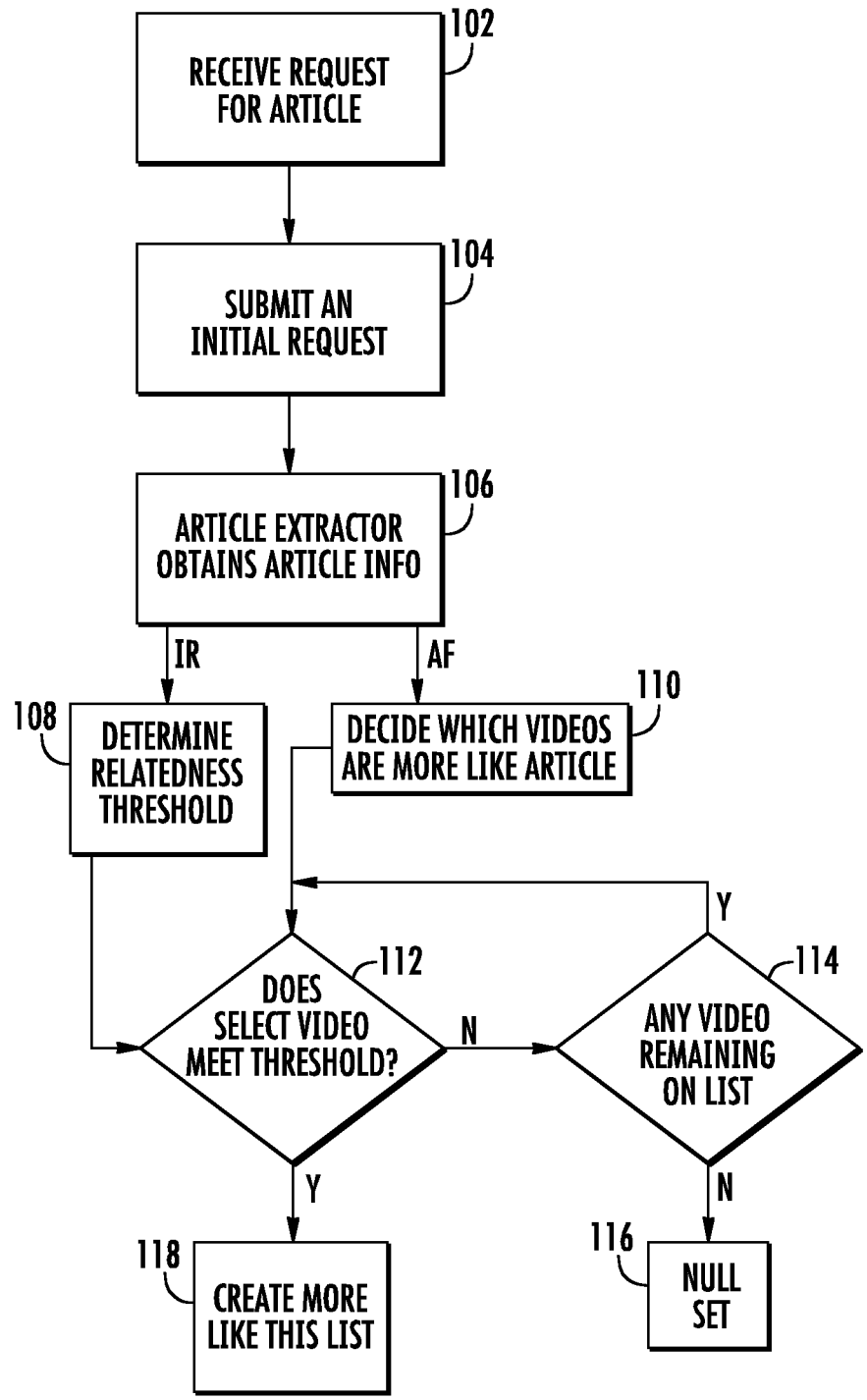
FIG. 2 is a flowchart for operation of the system in accordance with the invention.

Reference is now also made to FIG. 2, in which in a first step 102, end point 10 initiates the request for a video to be placed in an article at a URL having text on the associated page by implementing an application programming interface (API) to search a content library. Endpoint 10 initiates a work item by placing an initial request (IR) on the blackboard 30 in a step 104. In a preferred non-limiting embodiment, the IR includes an identification such as an address of the URL which requires the video to be placed upon it; how many videos are needed at that URL; user information pertinent to that user such as a tracking cookie, a user ID or the like; the title of the article located at the URL; and the INSID, an identifier generated by an analytic system for tracking all interactions by this particular user on this particular page, including advertising loads, page loads, widget (any component that holds a video player product (the player loads before the video does)), loads, video loads, percentage of video viewed and the like.

In a step 106, the input of the IR causes article extractor 12 to begin work. The article extractor 12 queries an external system such as a page service 14 to grab an article as a function of the URL. Page Service 14, when given the URL, mimics a user's browser to operate on the URL and stores the content that the external webserver produces. Page Service 14 sanitizes the result of the request into both title and content. The title and content are each considered features of the URL because they are derivative information of the original IR. It should be noted, that once Article Extractor 12 has the information it places the article on Blackboard 30 as article features (AF). While article features are title and text in a preferred non limiting embodiment, article features may also include publisher, publish date, author, length of article or the like. It is noted, there may be a possible failure if the same URL is queried simultaneously by many sources. In this instance, the request by the Article Extractor 12 can be made non-blocking at the expense of dropping the request due to any conflict.

In a third step 108, a Threshold Extractor 16 also receives the IR and begins work. Threshold 16 communicates with a third party service for data, such as a dynamo table, by way of non-limiting example, for thresholds for solving the single issue of determining whether a threshold has been met. The Threshold Extractor 16 extracts the information from dynamo table 18 and queries the information from the Tuple space and is part of making the recommendation.

Different publishers may have different requirements relating to the specificity of recommendations produced by system 100. Some publishers have strict limitations on acceptability of any recommendation made by system 100 as a whole such that only the most rigorously accurate article video pairings would be accepted. Other publishers are far more interested in having video, any video on their page in response to the request so long as the video is somewhat related. The Threshold Extractor 16 consults the external service 18 that stores the publisher's preference and produces that preference as a threshold feature (TF) in response to the IR. The TF is placed on the blackboard 30.

Once the AF are present on blackboard 30 from article extractor 12; the AF is worked upon by the more like this recommender 20 in a step 110. More like this recommender 20 communicates with an external service 22, a remote source, in a non-limiting embodiment, in response to the AF utilizing the title and article features provided by the AF to determine which videos from a source library are more like the article than the other remaining videos in a source library. Remote source 22, in a preferred embodiment is a remote SOLR index of available videos. More like this recommender 20 utilizes, by way of non-limiting example, the frequencies of uncommon words in the article to match with uncommon words associated with the videos as identified in SOLR index third party remote source 22; by way of non-limiting example.

As a function of matches, more like this recommender 20 outputs more like this recommendation (MLTR) to Blackboard 30 as a set of recommended videos. In a preferred non-limiting embodiment, the number of more like this recommendations is at least as great as the number of videos required as determined in the IR. As can be seen from FIGS. 1 and 2, the structure and logic of the system enable more like this recommender 20 and threshold extractor 16 to work in parallel; speeding the response time and increasing the overall efficiency of the system.

When the more like this recommendation and the threshold features exist on blackboard 30, a more like this decider 24 works on these inputs to output a more like this decision (MLTD) in a step 112. More like this decider 24 filters the more like this recommendations, as a function of the results of the threshold features (TF) output by threshold extractor 16. Therefore, in an exemplary, non-limiting embodiment, if a certain publisher has requested that only extremely close video/article pairs (i.e. high threshold) be loaded at the web page corresponding to the input URL then more like this decider 24 will actually reject all recommendations that are below the specified threshold. The more like this decider, may produce a MLTD which is the null set in step 116, i.e. if there are no more videos to consider, as determined in a step 114, and there are no acceptable recommendations for that particular IR. However, if the more like this recommendations meet or exceed the threshold features, then the more like this decider 24 will output an MLTD corresponding to one or more videos to be placed in the article in a step 118.

Once the results of more like this decider 24 are present on blackboard 30, then an endpoint 26 receives the MLTD and return the results to the specified search API 28. Additionally, if a user accesses the endpoint through a debug API, then the entire contents of the Tuple are produced, not just the decision. This way a user can determine how a certain recommendation (or lack thereof) was produced.

As can be seen from the above, the system is a federated recommender system. A user will make a request and the various workers will decorate that request with their own information as the relevant context becomes available. An initial set of workers such as threshold extractor 16 and article extractor 12 can make relevant contributions on the initial request. Once they are done with their operation, then a second level of workers such as more like this recommender 20 and more like this decider 24 operate on the set of contributions from the initial modules and continue to work upon the information until a final decision is made. As the result of the federated system, different pathways can be generated implicitly due to a lack of hard coating of inputs and outputs; new workers may be added on the chain by consuming existing outputs and then creating their own outputs until a final collation has occurred at an endpoint as a final result.

Furthermore, the more like this recommendation system is, in itself, a non-limiting example. Other recommenders, such as those operating as a function of an article title, those based on tracking the user, those that use different internal definitions of article similarity, or the like, are all capable as being used as the choosing filter; for this application. The example of more like this filtering was used for ease of description. The more like this decider is, in itself, also a non-limiting example; additional decision mechanisms can be used to determine which recommendation to choose i. e., choose based on the recommender that provided it, choose it because multiple recommenders provided it, choose it based on time of day or knowledge of the person visiting, choose based on engagement history of the videos provided by recommenders, or show all of them for the problem of content discovery by human editors.

As can be seen from the above, the more like this recommendation system moves the data networking from a monolithic recommendation system to a system in which two or more distinct components communicate with one another using the blackboard as a shared memory space. By following the publication/subscription methodology, one component completes work and places the completed work on the blackboard allowing other components to consume worker outputs; enabling some functionalities to be performed simultaneously. The decision is decoupled from the recommendation. In this way, the decision can be the null set, while continuing over all operation avoiding the shortcomings of the prior art.

Thus, there have been shown, described and pointed out novel features of the present invention as applied to preferred embodiments thereof, it will be understood that various submissions and substitutions and changes in the form in detail are contemplated to the disclosed invention which may be made by those skilled in the art without departing from the spirit and scope of the invention. It is the intention therefore to be limited only as indicated by the scope of the claims appended hereto. It is also to be understood that the following claims are intended to cover all of the generic and specific features of the invention herein described and all statements of the scope of the invention which, is a matter of language, might be said to fall there between.

What is claimed is:

1. A system for selecting a video to be inserted into an article displayed at a web page comprising:
a processor;
a blackboard for storing extracted values for operation thereon by the processor, the processor including one or more workers; the workers including:
an article extractor, extracting information from the article, communicating with the blackboard, and creating an article feature as a function of information extracted from the article and inputting the article feature to the blackboard;
a threshold extractor, communicating with the blackboard, determining a threshold factor from a dynamo table, the threshold factor indicating a predetermined threshold of relevance of the video to the article, and inputting the threshold factor to the blackboard;
a more like this recommender, communicating with the blackboard, receiving the article feature from the blackboard and generating and outputting to the blackboard, as a function of the article feature, a more like this recommendation as a list of videos to be placed in the article and inputting the more like this recommendation to the blackboard; and
a more like this decider, communicating with the blackboard, and determining, as a function of the threshold factor and the more like this recommendation, which video from the list of videos to select to be inserted into the article.

2. The system for selecting a video of claim 1, wherein the article feature includes at least one of a title of an article and a text of an article.

3. The system for selecting a video of claim 2, wherein the article extractor communicates with a page service to obtain the title and the text of the web page at which the video is being placed.

4. The system for selecting a video of claim 1, further comprising an endpoint for initiating a request to place a video by inputting an initial request to the blackboard, the article extractor creating an article feature in response to the initial request.

5. The system for selecting a video of claim 4, wherein the initial request includes a URL identifier, and at least one of user information, a user ID, the title of the article located at the URL, and an identifier for tracking interactions by a particular user and the webpage associated with the URL.

6. The system for selecting a video of claim 4, wherein the threshold extractor determines a threshold factor in response to the initial request.

7. The system for selecting a video of claim 1, wherein the more like this recommender determines a more like this recommendation by comparing a frequency of uncommon words appearing in the article and a frequency of the uncommon words appearing in a description of each video of the list of videos.

8. A computer program product for selecting a video to be inserted into an article displayed at a web page comprising:
a non transitory computer readable storage medium and program instructions stored on the computer readable storage medium, the program instructions comprising instructions to:
store extracted values on a blackboard for operation thereon by one or more workers; extract an article feature from an article, wherein the article feature is input into the blackboard;
obtain a threshold factor from a dynamo table, wherein the threshold factor is input into the blackboard, the threshold factor indicating a predetermined threshold of relevance of the video to the article; utilize the article feature, to enable a more like this recommender to generate a list of videos to be placed in the article; and
utilize the threshold factor and the more like this recommender list, to enable a more like this decider to determine which video to select for insertion into the article.

9. The computer program product for selecting a video of claim 8, wherein the article feature includes at least one of a title of an article and text of an article.

10. The computer program product for selecting a video of claim 9, wherein extracting an article feature from an article requires communication with a page service to obtain the title and the text of the web page at which the video is being placed.

11. The computer program product for selecting a video of claim 8, further comprising an endpoint for initiating an initial request to place a video on the webpage, to the blackboard, wherein the article feature is created in response to the initial request.

12. The computer program product for selecting a video of claim 11, wherein the threshold factor is determined in response to the initial request.

13. The computer program product for selecting a video of claim 8, wherein the more like this recommender determines a more like this recommendation list by comparing a frequency of uncommon words appearing in the article and a frequency of the uncommon words appearing in a description of each video of the list of videos.

14. A system for selecting a video to be inserted into an article displayed at a webpage comprising:
   one or more computer processors;
   one or more computer readable media; program instructions stored therein for execution by at least one or more computer processors, the program instructions comprising instructions to:
      store extracted values on a blackboard for operation thereon by one or more workers; extract an article feature from an article, wherein the article feature is input into the blackboard;
      determine a threshold factor from a dynamo table, wherein the threshold factor is input into the blackboard, the threshold factor indicating a predetermined threshold of relevance of the video to the article;
      utilize the article feature, to enable a more like this recommender to generate a list of videos to be placed in the article; and
      utilize the threshold factor and the more like this recommender list, to enable a more like this decider to determine which video to select for insertion into the article.

15. The system for selecting a video of claim 14, wherein the article feature includes at least one title of an article and at least one text of an article.

16. The system for selecting a video of claim 15, wherein extracting an article feature from an article requires communication with a page service to obtain the title and the text of the web page at which the video is being placed.

17. The system for selecting a video of claim 14, further comprising an endpoint for initiating an initial request to place a video on the webpage, to the blackboard, wherein the initial request creates the article feature in response to the initial request.

18. The system for selecting a video of claim 17, wherein the threshold factor is determined in response to the initial request.

19. The system for selecting a video of claim 14, wherein the more like this recommender determines a more like this recommendation list by comparing a frequency of uncommon words appearing in the article and a frequency of the uncommon words appearing in a description of each video of the list of videos.

20. A method for selecting a video to be inserted into an article displayed at a web page comprising:
   storing extracted values on a blackboard for operation thereon by one or more workers; extracting an article feature from an article, wherein the article feature is input into the blackboard;
   determining a threshold factor from a dynamo table, wherein the threshold factor is input into the blackboard, the threshold factor indicating a predetermined threshold of relevance of the video to the article;
   wherein, a more like this recommender, receives the article feature and generates a list of videos to be placed in the article; and
   wherein a more like this decider receives the threshold factor and the more like this recommender list and determines which video to select for insertion into the article.

21. The method for selecting a video of claim 20, wherein the article feature includes at least one title of an article and at least one text of an article.

22. The method for selecting a video of claim 21, wherein extracting an article feature from an article requires communication with a page service to obtain the title and the text of the web page at which the video is being placed.

23. The method for selecting a video of claim 20, further comprising an endpoint for initiating an initial request to place a video on the webpage, to the blackboard, wherein the article feature is created in response to the initial request.

24. The method for selecting a video of claim 23, wherein the threshold factor is determined in response to the initial request.

25. The method for selecting a video of claim 20, wherein the more like this recommender determines a more like this recommendation list by comparing a frequency of uncommon words appearing in the article and a frequency of the uncommon words appearing in a description of each video of the list of videos.

* * * * *